No. 11,914. Reissued June 11, 1901.
E. L. McCLURE.
LOOSE LEAF LEDGER.
(Application filed Oct. 11, 1900.)
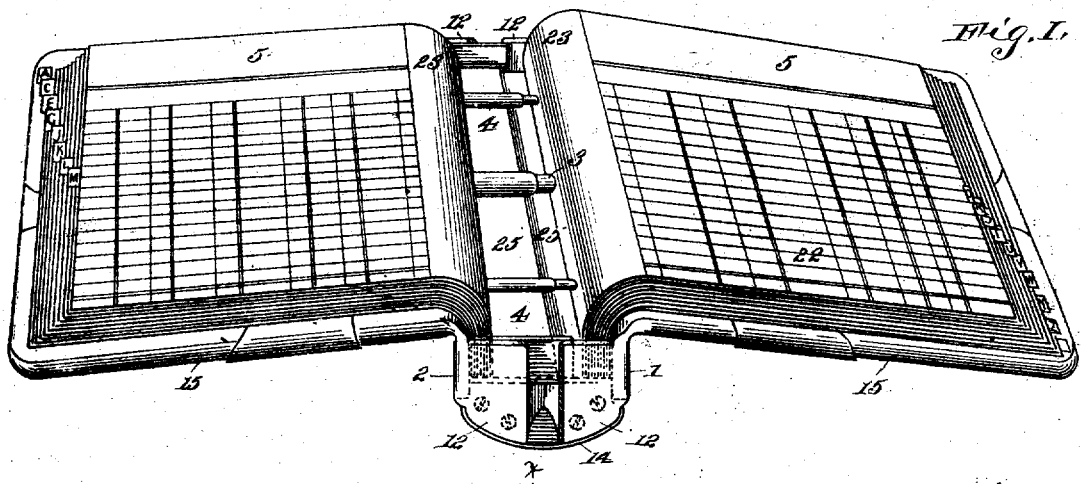
Fig. I.
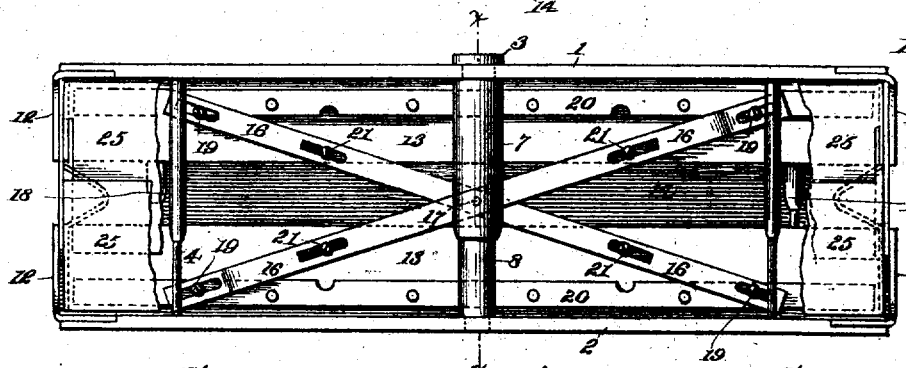
Fig. II.
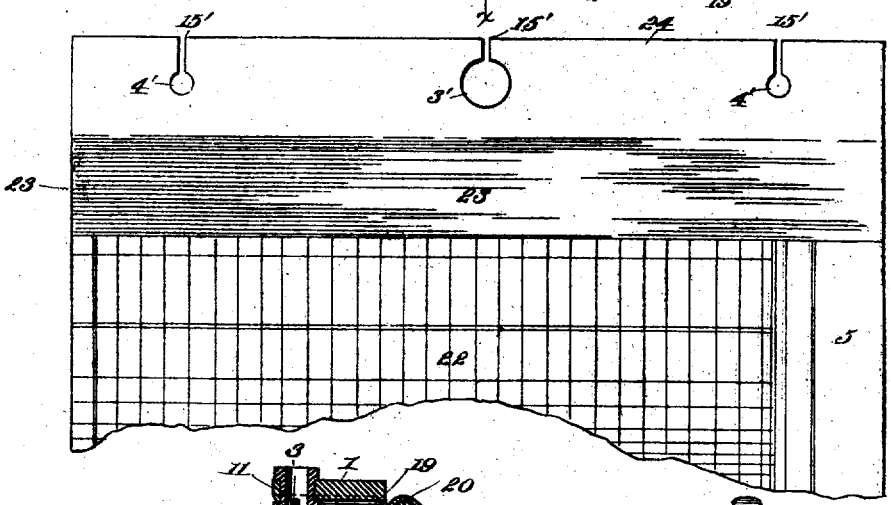
Fig. III.
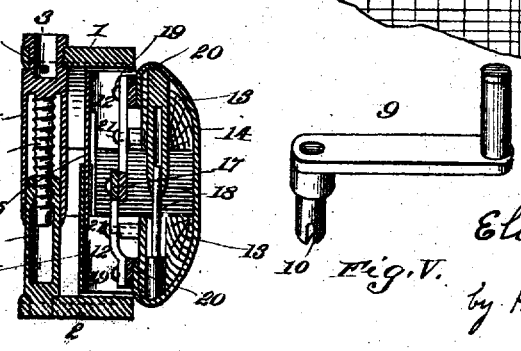
Fig. IV.
Fig. V.
Witnesses:
Alex. Scott
A. M. Long.
Inventor:
Elias L. McClure,
by Henry H. Bates,
atty.

UNITED STATES PATENT OFFICE.

ELIAS LOWE McCLURE, OF SAN FRANCISCO, CALIFORNIA.

LOOSE-LEAF LEDGER.

SPECIFICATION forming part of Reissued Letters Patent No. 11,914, dated June 11, 1901.

Original No. 644,210, dated February 27, 1900. Application for reissue filed October 11, 1900. Serial No. 32,739.

*To all whom it may concern:*

Be it known that I, ELIAS LOWE McCLURE, a citizen of the United States, residing at San Francisco, county of San Francisco, and State of California, have invented certain new and useful Improvements in Loose-Leaf Ledgers; and I hereby declare the following to be a full, clear, and exact description of the same, reference being had to the accompanying drawings, forming a part of this specification.

My invention relates to what are called "loose-leaf" ledgers that contain summarized accounts or records to hold a variable quantity of such sheets or leaves that can be removed, replaced, or transferred at pleasure for classification or indexing; also, relates to an improved form of such ledgers.

My invention consists in an improved expansive back designed to retain its shape and contour irrespective of the quantity of leaves contained, improved means for securing parallelism of the clamping-bars and back for closing, clamping, and securing the back upon the leaves, and in minor details hereinafter described.

Figure I is a view in perspective of one of my improved loose-leaf ledgers open and partially filled with leaves. Fig. II is a front edge view of the same ledger with the covers removed, also a portion of the back guard-plates broken away. Fig. III is a partial flat view of a leaf adapted for use in the ledger and its supplementary files. Fig. IV is a section on the line $x$ $x$ in Fig. II. Fig. V is a perspective view of the key for adjusting the ledger and clamping the contained leaves.

It will be understood that the covers, clamping-bars, and exterior of my improved device are covered or incased with leather or other suitable material in the usual manner of bookbinding.

Referring to Figs. I, II, III, and IV, the ledger mechanism is composed of two metallic bars 1 and 2, adjustably connected by a central register-pin 3 and two other register-pins 4 at the ends, corresponding to the holes in the leaf, Fig. III, that have reference-numbers 4′ 3′ 4′.

The covers 15 and their binding being of the usual type and form do not require description.

The register-pins 3 and 4, also the dowel or guard pins 18, are of telescopic construction to permit the bars 1 and 2 to be expanded or closed as the number or thickness of the loose leaves 5 contained in the ledger may require, the center pin 3 being larger in diameter and provided with a screw 6, made integral with the removable barrel 7 and meshing into screw-threads formed in the top of the barrel 8, as seen in Fig. IV.

By turning the barrel 7 with the key 9, which is slotted at 10 to fit on a cross-pin 11 in the socket of the barrel 7, the bars 1 and 2 are moved together or apart, the telescopic side pins 4 and dowel-pins 18 sliding accordingly.

To maintain the shape and contour of the back, I employ two bars 13, preferably of wood, connected to and moving with the bars 1 and 2 by means of the end plates 12. The bars 13 are held in a true vertical plane and guided by the telescopic dowel-pins 18. (Shown in section at Fig. IV.) Over these bars 13 and riveted to the metal bars 20 is stretched a flexible cover 14, which forms the back of the ledger, on which its title can be printed. This cover 14, preferably of leather, is kept in constant tension and smooth by means of the equalizing or compensating levers 16, connected together at their outer ends by the pins 19 to the bars 20, the holes in the levers 16 being slotted to accommodate the arc described from the center at 17.

The bars 16 are attached to or fulcrumed on the bars 13 by the pins 21, moving in slots, as seen in Fig. II, so that when these bars 13, with the bars 1 and 2, are expanded or closed the levers 16, by means of the pins 19, move the bars 20 inward or outward twice the distance moved by the bars 1 and 2, thus keeping the back-cover 14 in uniform tension, the latter sliding over the rounded edges of the bars 13, as will be understood.

The leaves 5 consist of a face 22 to receive the record, joined by a flexible web 23 to the strip 24, in which are the register-holes 3′ and 4′, the latter being slotted out to the edge, as shown at 15′, so the leaves can be placed laterally on the register-pins 3 and 4, and thus be inserted in or removed from the ledger and arranged or rearranged in any order desired without removing superimposed leaves or pages.

The operating or equalizing mechanism of the ledger is concealed and separated from the leaves or pages by means of the guard-plates 25, attached to the bars 1 and 2 and made in two parts overlapping, as seen in Fig. IV, so as to slide one upon the other when the bars 1 and 2 are expanded or closed, thus protecting the inner edges of the leaves 5 from contact with the mechanism at the back and presenting a finished appearance when the ledger is empty or partially filled.

The covers 15 are of the usual construction and flexibly united to the bars 1 and 2.

Having thus explained my invention, what I claim as new, and desire to secure by Letters Patent, is—

1. In a loose-leaf ledger, the combination of the fixed back plate, movable back plate, both having curved edges, with means for moving said movable plate, and the flexible and compensating back-covering, passing around said back plates, and means for maintaining it in uniform tension when the said movable plate is moved relatively to the fixed back plate.

2. In a loose-leaf ledger, the main clamping-bars 1, 2, rounded bars 13, end plates 12 connecting said bars 13 with bars 1 and 2, bars 20, a connection between bars 20 and bars 13 whereby they move simultaneously, and a flexible back-covering attached to bars 20 and sliding over bars 13 as the latter expand or contract, substantially as specified.

3. In a loose-leaf ledger, the main bars 1 and 2 provided with telescopic register-pins in the middle and at each side, the back-bars 13 and a flexible back-cover to slide upon the same, and in combination therewith the equalizing-levers 16 to maintain uniform tension of the back-cover, operating substantially as described.

4. In a loose-leaf ledger, in combination, main clamping-bars 1, 2, provided with telescoping register-pins 4 and a screw binding telescoping pin 3, of larger diameter than pins 4, loose leaves 5, provided with perforations 3′ 4′ to fit the said telescoping pins, slitted as at 15′ to admit of insertion and removal, rounded bars 13, bars 20, equalizing-bars 16, and flexible back-covering 14, substantially as specified.

5. In a loose-leaf ledger, movable clamping-bars 1, 2, rounded bars 13, end plates 12 connecting said bars, telescoping register-pins 4, telescoping screw binding-pin 3, bars 20, equalizing-levers 16, guard-plates 25, and flexible back-covering 14, substantially as specified.

6. In a loose-leaf ledger, the main clamping-bars 1 and 2, means to expand and close the same, and means to hold them parallel when moved, and in combination therewith the bars 13, the loose back-cover 14, and the levers 16 attached to and maintaining tension of the loose back-cover, substantially in the manner described.

7. In a loose-leaf ledger, the main bars 1 and 2, means to expand and close the same, the back-bars 13 connected to and moving therewith, the telescopic register-pins 3 and 4, connecting and guiding the main clamp-bars and the telescopic dowel-pins 18, connecting and guiding the back-bars 13, combined and operating substantially as specified.

8. In a loose-leaf ledger, the main clamping-bars 1, 2, means to expand and contract the same, equalizing-levers for preserving parallelism, and overlapping guard-plates 25, attached to and moving with said bars 1 and 2, located in front of said equalizing mechanism, whereby the latter is concealed from view, substantially as specified.

9. In a loose-leaf ledger, the combination with the back-bars of means for moving said bars toward and from each other, a loose back-cover for said bars, and of a take-up connection interposed between the free ends of said cover, actuated automatically upon the movement of said bars, whereby the slack may be compensated for as the back is contracted, and the cover give outward as the book is expanded.

10. In a loose-leaf ledger, the combination with the back-bars of screw-actuated lock mechanism by means of which the bars are adjusted toward or from each other so as to contract or expand the book, a cover for the bars, and a take-up connection interposed between the free ends of said cover, actuated upon the movement of said bars so as to shorten or lengthen the said cover upon a contraction or expansion of the book.

11. In a loose-leaf ledger, the main clamping-bars 1, 2, rounded bars 13, bars 20, a connection between the bars 20 and 13, whereby they move simultaneously, and a flexible back-covering attached to the bars 20 and sliding over the bars 13 as the latter expand and contract, substantially as specified.

12. In a loose-leaf ledger, the combination with the back and loose cover therefor, of an automatic take-up connected with the free ends of the cover, whereby the cover may be adjusted to the adjustment of the back, and of a screw-actuated lock mechanism by means of which the back is contracted or expanded.

13. In a book of the character described, the combination with clamping-bars, of means for varying their relative positions, an expansible cover, means for preserving the parallelism of the clamping-bars, and overlapping guard-plates moving with the clamping-bars and located in front of the expansible cover.

In testimony whereof I have signed my name to this specification in the presence of two subscribing witnesses.

ELIAS LOWE McCLURE.

Witnesses:

JOHN RICHARDS,
ELMER WICKES.